[19] United States Patent
Fabricius et al.

[11] Patent Number: 5,777,127
[45] Date of Patent: Jul. 7, 1998

[54] THIOHETEROCYCLIC NEAR-INFRARED DYES

[75] Inventors: Dietrich Max Fabricius, Hendersonville, N.C.; Gregory Charles Weed, Towanda, Pa.

[73] Assignee: Sterling Diagnostic Imaging, Inc., Brevard, N.C.

[21] Appl. No.: 733,419

[22] Filed: Oct. 18, 1996

Related U.S. Application Data

[60] Division of Ser. No. 413,530, Mar. 30, 1995, Pat. No. 5,576,443, which is a continuation-in-part of Ser. No. 72,851, May 26, 1993, Pat. No. 5,440,042.

[51] Int. Cl.$^6$ .................... C07D 277/04; C07D 401/00
[52] U.S. Cl. .................... 548/146; 548/186; 548/193; 548/201; 546/269.7
[58] Field of Search .................... 548/146, 186, 548/193, 201; 546/269.7

[56] References Cited

U.S. PATENT DOCUMENTS 4,882,265  11/1989  Laganis et al. .................... 430/522

FOREIGN PATENT DOCUMENTS

| | | |
|---|---|---|
| 0288076 | 10/1988 | European Pat. Off. . |
| 0420012 | 4/1991 | European Pat. Off. . |
| 420012 | 4/1991 | European Pat. Off. . |
| 430244 | 6/1991 | European Pat. Off. . |

OTHER PUBLICATIONS

L. Strekowski et al., Facile Derivatizations of Heptamethine Cyanine Dyes, Synthetic Communications, 22917), pp. 2593–2598, 1992.

L. Strekowski et al., Substitution Reactions of a Nucleofugal Group in Heptamethine Cynanine Dyes, Synthesis of an Isothiocyanato Derivative for Labeling of Proteins with a Near–Infrared Chromophore, J. Org. Chem., 57, pp. 4578–4580, 1992.

R. J. Williams, et al., Comparison of Covalent and Noncovalent Labeling with Near–Infrared Dyes for the High–Performance Liquid Chromatographic Determination of Human Serum Albumin, Anal. Chem., vol. 65, pp. 601–605, 1993.

Slominskii et al., "Polymethine Dyes With Hydrocarbon Bridges . . . ", CA, vol. 91 (1979), p. 91, ABS#22390h.

*Primary Examiner*—Mukund J. Shah
*Assistant Examiner*—Tamthom T. Ngo
*Attorney, Agent, or Firm*—Joseph T. Guy, Jr.

[57] ABSTRACT

Disclosed is a novel near-infrared absorbing dye of formula:

$$R^4\underset{R^5}{\overset{X^1}{\diagdown}}\!\!=\!\!CH-CH\!\!=\!\!\underset{\underset{R^3}{|}}{\overset{(CH_2)_n}{\diagup\diagdown}}\!\!-\!\!CH\!\!=\!\!CH\underset{\underset{R^2}{|}}{\overset{X^2}{\diagup}}\!\!\underset{R^7}{\overset{R^6}{\diagdown}}\!Z$$

with N—$R^1$ on left ring and N$^+$—$R^2$ on right ring, S—$R^3$ at center.

wherein $X^1$, $X^2$ independently represents —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents a ring chosen from a set consisting of aryl, substituted aryl, and a heterocyclic ring of a type present in photographic emulsions;

$R^4$, $R^5$, $R^6$ and $R^7$ independently represent hydrogen, alkyl of 1–10 carbons, substituted alkyl of 1–10 carbons. $R^4$ and $R^5$ taken together or $R^6$ and $R^7$ taken together can represent atoms necessary to form a 5 or 6-membered aliphatic ring, an aromatic six-membered ring, an aromatic 10-membered ring, a substituted aromatic six-member ring or a substituted aromatic 10-member ring;

$R^8$, $R^9$ independently represent alkyl of 1–10 carbons, substituted alkyl of 1–10 carbons, aryl of 6–10 carbons, or substituted aryl of 6–10 carbons; and $R^{10}$ represents an alkyl of 1–10 carbons, substituted alkyl of 1–10 carbons, aryl of 6–10 carbons, or substituted aryl of 6–10 carbons;

with the proviso that when $R^3$ is phenyl or substituted phenyl and n=3, $R^1$ or $R^2$ is not an unsubstituted alkyl.

26 Claims, No Drawings

THIOHETEROCYCLIC NEAR-INFRARED DYES

This is a divisional application of U.S. Pat. No. 5,576,443 issued Nov. 11, 1996 which is in turn a continuation-in-part of U.S. application Ser. No. 08/072,851 filed May 26, 1993 now U.S. Pat. No. 5,440,042 issued Aug. 8, 1995.

BACKGROUND OF THE INVENTION

1. Field of the Invention.

This invention relates to dye technology. More specifically, this technology relates to dyes which absorb in the near-infrared.

2. Description of Related Art.

The development of the gallium-arsenic semiconductor laser, or diode laser, is expected to extend the use of lasers into the wavelength range of 780–830 nm. The impact of this laser is expected to cover diverse fields including opto-electronic systems such as laser optical recording systems, thermal writing display systems, laser printing systems, and medical applications such as cancer treatment and imaging.

Almost any laser application requires some means for absorbing the energy of the laser beam to accomplish a meaningful task. Full exploitation of these new lasers awaits the development of near-infrared absorbing dyes and there has been on ongoing effort in the art to provide such. Provided herein is a novel class of dyes which absorb throughout the near-infrared region.

SUMMARY OF THE INVENTION

A novel thioheterocyclic near-infrared absorbing dye is provided of formula

[chemical structure]

wherein $X^1$ and $X^2$ independently represent —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents a ring chosen from a set consisting of aryl, substituted aryl, and a heterocyclic ring of the type present in photographic emulsions;

$R^4$ and $R^5$ independently represent hydrogen, alkyl of 1–10 carbons or substituted alkyl of 1–10 carbons, or $R^4$ and $R^5$ taken together represent atoms necessary to form a 5 or 6-membered aliphatic ring, an aromatic six-membered ring, an aromatic 10-membered ring, a substituted aromatic six-member ring or a substituted aromatic 10-member ring;

$R^6$ and $R^7$ independently represent hydrogen, alkyl of 1–10 carbons, or substituted alkyl of 1–10 carbons, or $R^6$ and $R^7$ taken together represent atoms necessary to form a 5 or 6-membered aliphatic ring, an aromatic six-membered ring, an aromatic 10-membered ring, a substituted aromatic six-member ring or a substituted aromatic 10-member ring;

$R^8$ and $R^9$ independently represent alkyl of 1–10 carbons, substituted alkyl of 1–10 carbons, aryl of 6–10 carbons or substituted aryl of 6–10 carbons;

$R^{10}$ represents an alkyl of 1–10 carbons, substituted alkyl of 1–10 carbons, aryl of 6–10 carbons or substituted aryl of 6–10 carbons;

Z is a counterion; and when $R^3$ is phenyl or substituted phenyl arid n=3, $R^1$ or $R^2$ is not an unsubstituted alkyl.

DETAILED DESCRIPTION OF THE INVENTION

Dyes of the current invention are defined by the following formula:

[chemical structure]

wherein $X^1$ and $X^2$ independently represent —$CR^8R^9$—, —S—, —Se—, —$NR^{10}$—, —CH=CH— or —O—;

n is an integer of 2 or 3;

$R^1$ and $R^2$ independently represent alkyl of 1 to 10 carbons or substituted alkyl of 1 to 10 carbons;

$R^3$ represents a ring chosen from a set consisting of aryl of 6–10 carbons, substituted aryl of 6–10 carbons, and a heterocyclic ring of a type present in photographic emulsions;

$R^4$ and $R^5$ independently represent hydrogen, alkyl of 1–10 carbons, or substituted alkyl of 1–10 carbons, or $R^4$ and $R^5$ taken together represent atoms necessary to form a 5 or 6-membered aliphatic ring, an aromatic six-membered ring, an aromatic 10-membered ring, a substituted aromatic six-member ring or a substituted aromatic 10-member ring;

$R^6$ and $R^7$ independently represent hydrogen, alkyl of 1–10 carbons or substituted alkyl of 1–10 carbons, or $R^6$ and $R^7$ taken together represent atoms necessary to form a 5 or 6-membered aliphatic ring, an aromatic six-membered ring, an aromatic 10-membered ring, a substituted aromatic six-member ring or a substituted aromatic 10-member ring;

$R^8$ and $R^9$ independently represent alkyl of 1–10 carbons, substituted alkyl of 1–10 carbons, aryl of 6–10 carbons or substituted aryl of 6–10 carbons;

$R^{10}$ represents an alkyl of 1–10 carbons, substituted alkyl of 1–10 carbons, aryl of 6–10 carbons or substituted aryl of 6–10 carbons;

Z is a counterion; and when $R^3$ is phenyl or substituted phenyl and n=3, $R^1$ or $R^2$ is not an unsubstituted alkyl.

While not limited thereto a preferred compound is obtained when $X^1$ or $X^2$ is chosen from a set consisting of $CR^8R^9$, S or $NR^{10}$. Most preferred is $X^1$ or $X^2$ being $CR^8R^9$.

A preferred compound is obtained when $R^1$ or $R^2$ represents an alkyl of 1 to 5 carbons and most preferred is $R^1$ or R2 substituted with a sulfonate group or a carboxyl group.

The term "heterocyclic ring of a type present in photographic emulsions" refers specifically to a heterocyclic nuclei comprising 5 or 6 atoms in a heterocyclic ring. Preferably, $R^3$ represents a heterocyclic ring composed of atoms selected from a group consisting of C, N, O, S and Se. Specifically preferred examples of heterocyclic rings of the types present in photographic emulsions are chosen from a set consisting of:

the thiazole series; e.g., thiazole, 4-methylthiazole, 4-plienylthiazole, 5-methylthiazole, 5-phenylthiazole, 4,5-dimethyltliiazole, 4,5-diphenylthiazole or 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazote, 5-hydroxybenzothiazole or 6-hydroxybenzothiazole;

the naphthothiazole series; e.g., naphtho|1,2|- thiazole, naphtho|2,1|thiazole, 5-methoxynaphtho-|2,1|-thiazole, 5-ethoxynaphtho|2,1|thiazole, 8-methoxynaphtho|1,2|thiazole or 7-methoxynaphtho|1,2|thiazole;

the thianaphtheno-7',6',4,5-thiazole series; e.g., 4'-methoxythianaphtheno-7',6',4,5,thiazole;

the oxazole series; e.g., 4-methyloxazole, 5-methyloxazole, 4-phenyloxazole, 4,5-diphenyloxazole, 4-ethyloxazole, 4,5-dimethyloxazole or 5-phenyloxazole;

the benzoxazole series; e.g., benzoxazole, 5-chlorobenzoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole or 6-hydroxybenzoxazole;

the naphthoxazole series, e.g., naphtho|1,2|oxazole, raphtho|2,1|oxazole;

the selenazole series; e.g., 4-methylselenazole or 4-phenylselenazole;

the benzoselenazole series; e.g., benzoselenazole, 5-chlorobenzoselenazole, 5-methylbenzoselenazole, 5-methoxybenzoselenazole, 5-hydroxybenzoselenazole or tetraliydrobenzoselenazole;

the naphthoselenazole series; e.g., naphthol|1,2| selenazole or naphtho|2,1|selenazole;

the thiazoline series; e.g., thiazoline, 4-methylthiazoline;

the 2-quinoline series; e.g., quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline or 8-hydroxyquinoline;

the 4-quinolirie series; e.g., quinoline, 6-methoxyquinoline, 7-methoxyquinoline, 7-methylquinoline or 8-methylquinoline;

the 1-isoquinoline series; e.g., isoquinoline or 3,4-dihydroisoquinoline;

the 3-isoquinoline series; e.g., isoquinoline;

the benzimidazole series; e.g., 1,3-diethylbenzimidazole or 1-ethyl-3-phenylbenzimidazole;

the 3,3-dialkylindolenine series; e.g., 3,3-dimethylindoline, 3,3,5-trimethylindolenine or 3,3,7-trimethylindolenine;

the 2-pyridine series; e.g., pyridine or 5-methylpyridine;

the 4-pyridine series; e.g., pyridine;

the 3,3-dialkylbenz|e|indole series; e.g., 3,3-dimethylbenz|e|indole;

the tetrazole series; e.g., 1-phenyltetrazole or 1-methyltetrazole;

the triazole series; e.g., 1-phenyl-triazole or 1-methyltriazole;

the pyrimidine series; e.g., pyrimidine; and the thiadiazole series; e.g., 1,3,4-thiadiazole.

Preferred compounds are obtained when $R^3$ is chosen from a set consisting of:

the thiazole series; e.g., thiazole, 4-methylthiazole, 4-phenylthiazole, 5-methylthiazole, 5-phenylthiazole, 4,5-dimethylthiazole, 4,5-diphenylthiazole or 4-(2-thienyl)-thiazole;

the benzothiazole series; e.g., benzothiazole, 4-chlorobenzothiazole, 5-chlorobenzothiazole, 6-chlorobenzothiazole, 7-chlorobenzothiazole, 4-methylbenzothiazole, 5-methylbenzothi.azole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodohenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole or 6-hydroxybenzothiazole;

the benzoxazole series; e.g., benzoxazole, 5-chlorobenoxazole, 5-methylbenzoxazole, 5-phenylbenzoazole, 6-methylbenzoxazole, 5,6-dimethylbenzoxazole, 4,5-dimethylbenzoxazole, 5-methoxybenzoxazole, 5-ethoxybenzoxazole, 5-chlorobenzoxazole, 6-methoxybenzoxazole, 5-hydroxybenzoxazole or 6-hydroxybenzoxazole;

the benzimidazole series; e.g., 1,3-diethylbenzimidazole or 1-ethyl-3-phenylbenzimidazole;

the tetrazole series; e.g., 1-phenyltetrazole or 1-methyltetrazole;

the triazole series; e.g., 1-phenyl-triazole or 1-methyltriazole;

the pyrimidine series; e.g., pyrimidine; and the thiadiazole series; e.g., 1,3,4-thiadiazole.

The term "alkyl" is used herein in a manner consistent with the art to describe a straight chain or branched hydrocarbon group. The term "aryl" is used herein in a manner consistent with the art to describe an aromatic cyclic six-membered ring such as a phenyl group or an aromatic 10-membered ring such as a naphthalene group. The term "substituted alkyl", as used herein, specifically refers to a straight or branched alkyl which is substituted with at least one group such as sulfonate, carboxyl, hydroxy, halogen, carbonylalkyl, amine, aryl or —OL, where L is an alkyl or substituted alkyl of 1–10 carbons. The most preferred substituent for alkyl is sulfonate or carboxyl. The term "substituted aryl", as used herein, specifically refers to a six- or 10-membered ring which is substituted with at least one group such as sulfonate, carboxyl, hydroxy, halogen, carbonylalkyl, amine, aryl or —OL, where L is an alkyl or substituted alkyl of 1–10 carbons. The most preferred substituent for aryl is sulfonate or carboxylate. The term aromatic six-membered ring refers to atoms chosen from C, N, O and S necessary to form an aromatic ring. Specifically, preferred examples include, phenyl, pyridine, pyrimidine, pyrazine, and pyridazine. The term aromatic 10-membered ring refers to atoms chosen from C, N, O and S necessary to from an aromatic 10-membered ring. Specific examples include quinoline, naphthalene, phthalazine, naphthyridine, quinoxaline, quinazoline, cinnoline, and pteridine. The term 5 or 6-membered aliphatic ring refers to elements C, N, O and S necessary to form an aliphatic ring. Specific examples include cyclopentane, cyclopentene, cyclohexane, cyclohexene, furan, pyran, pyrrole, pyrroline, pyrrolidine, piperidine, and piperizine.

The term "counterion", or the equivalent thereto, refers to an anion or cation suitable to balance the charge. Preferred counterions include halide, alkaline earths, a complex inorganic ion (e.g., perchlorate), a common organic ion (e.g., tetrafluoroborate or tetraalkylammonium), or an anion of a strong acid (e.g., toluene sulfonate). Most preferably, counterions are chosen from a set consisting of sodium, potassium, chloride, bromide, iodide, $CF_3SO_3^-$, $ClO_4^-$, $BF_4^-$, $p\text{-}CH_3C_6H_4SO_3^-$ and $D_4N^+$ where D is a hydrogen or an alkyl of 1 to 10 carbons.

Exemplary dyes are provided in Table 1. Within Table 1, Y is defined by the following structures:

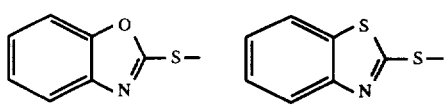

MBO  MBT

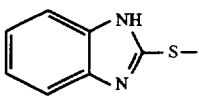

MBI  BMTD

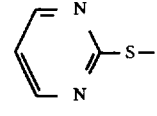

PYR  PMT

-continued

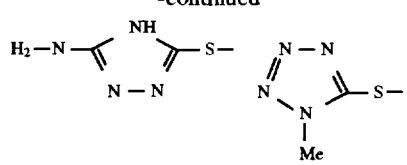

AMT  MMTE

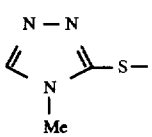 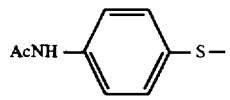

MTT  SAR

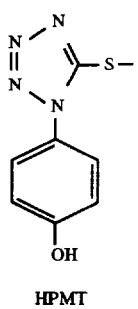

HPMT

When BMTD is used, the dye is in a form of a dimer with BMTD acting as a bridging group between two chromophores.

Dyes of the current invention are prepared by known organic preparative techniques in accordance with the following synthetic reaction:

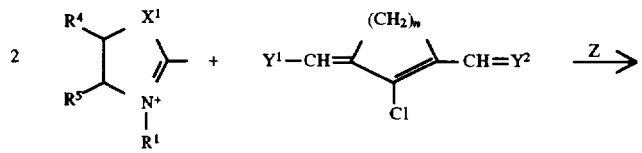

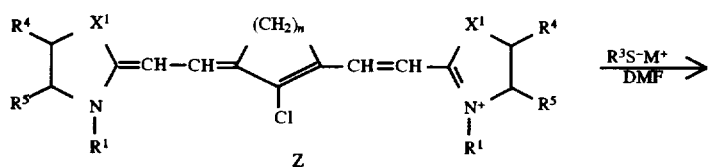

-continued

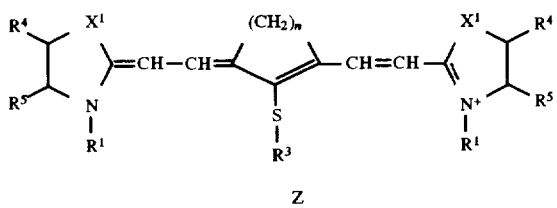

Z wherein $R^1$, $R^3$, $R^4$, $R^5$, $X^1$, n, and Z are as defined above. One of ordinary skill in the art would appreciate that the unsymmetrical dye could be prepared in an analogous manner by substituting one mole of the cyclic amine with a second cyclic amine as known in the art.

The choice of cyclic amine represented by:

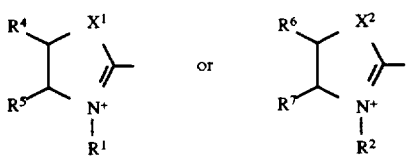

will determine the terminal rings of the final dye. As such when $X^1$ or $X^2$ is intended to be $CR^8R^9$ the proper starting material is an appropriately substituted pyrrole or indole; when $X^1$ or $X^2$ is intended to be —S— the proper starting material is an appropriately substituted thiazole, benzothiazole or naphthothiazole; when $X^1$ or $X^2$ is intended to be —Se— the proper starting material is an appropriately substituted selenazole, benzoselenazole or naphthselenazole; when $X^1$ or $X^2$ is intended to be —NR— the proper starting material is an appropriately substituted imidazole, benzimidazole, or naphthimidazole; when $X^1$ or $X^2$ is intended to be —CH=CH— the proper starting material is an appropriately substituted pyridine, quinoline or benzquinoline; and when $X^1$ or $X^2$ is intended to be —O— the proper starting material is an appropriately substituted oxazole, benzoxazole or naphthoxazole.

The following detailed synthetic procedures are not intended to be limiting in any way. Other compounds described herein can be prepared in an analogous mariner using standard organic synthetic procedures as known in the art.

STARTING MATERIALS

The following starting materials are used in the synthesis of the dyes.

Compound A

3H-Indolium, 2-[2-[2-chloro-3-[(1,3-dihydro-1,3,3-trimethyl-2H-indol-2-ylidene)ethylidenel]-1-cyclopenten-1-yl]ethenyl]-1,3,3-trimethyl-, salt with trifluoromethanesulfonic acid (1:1) is disclosed in Laganis and West, U.S. Pat. No. 4,882,265.

Compound B 1-(4-Sulfobutyl)-2,3,3-trimethylindolenium, inner salt 2,3,3-Trimethylindolenine (16.0 g, 0.01 mol) was heated with 10.4 ml melted 1,4-butanesultone and 20 ml o-xylene at 146° C. for 4 hours. The orange solution was cooled to 60° C. before adding acetone to dilute and induce crystallization. After cooling to room temperature, the product was collected by filtration, washed with acetone, and dried to yield 22.15 g of quaternary salt, mp 236° C.

Compound C

2-Chloro-3-(anilinomethylene)-1-(aniliniummethyl)-cyclopent-1-ene hydrochloride is disclosed by reference to Laganis and West, U.S. Pat. No. 4,882,265 and by reference to E.P. 0 420 012 A1.

Compound D

Compound B (4.58 g, 0.0155 mol), Compound C (2.69 g, 0.00775 mol), and 60 ml dimethylformamide were mixed together. Acetic anhydride (4.14 ml) was added, followed by 2.4 g (0.024 mol) triethylamine. The mixture was stirred at room temperature for 5.5 hrs. and then cooled to 0° C. before filtering. The filtrate was poured into 300 ml of stirred ethyl acetate and then chilled. After stirring overnight, the mixture was filtered and the recovered solid reslurried twice with ethyl acetate. After filtering and drying, the yield was 4.25 g, mp 210° C., $\lambda_{max}$(methanol)=806 ($\epsilon$=265,000).

Compound E

2-Chloro-3-(hydroxymethylene)-1-formylcyclohex-1-ene Dimethylformamide (40 ml) and 40 ml dichloromethane were mixed and cooled to 5° C. Phosphorous oxychloride (33 ml) was dissolved in 40 ml dichloromethane and added dropwise to the dimethylformamide/dichloro-methane solution at a rate sufficient to maintain the temperature below 25° C. Cyclohexanone (9 g) was added and the mixture heated to reflux for 5 hours. After cooling to room temperature, the reaction mixture was poured into 200 ml of ice and allowed to sit overnight. The quenched mixture was filtered to collect 9.62 g yellow crystals, mp 128° C., $\lambda_{max}$(methanol)=328 nm ($\epsilon$=15,000).

Compound F

Compound E (2.16 g, 0.0125 mol), Compound B (7.38 g, 0.025 mol), and 30 ml acetic acid were mixed together. Acetic anhydride (7 ml) was added, followed by 2.05 g (0.025 mol) anhydrous sodium acetate. The mixture was heated to reflux for 30 min., then cooled to room temperature and filtered. The filtrate was poured into 300 ml ethyl acetate and allowed to sit 3 hours. The solvent was decanted and replaced by fresh ethyl acetate. The mixture was agitated to break up the solid, filtered, and the residue reslurried twice with ethyl acetate. After filtering and drying, the yield was 6.55 g. mp 222° C. (dec), $\lambda_{max}$ (methanol)=782 nm ($\epsilon$=227,000).

Compound G 2,3,3-Trimethyl-(4-sulfobutyl)-1H-benzindolium, inner salt 1,1,2-Trimethyl-1H-benzindole (184.47 g, 0.88 mol) was heated with 91.8 ml liquid 1,4-butanesultone and 600 ml o-xylene at 144°–148° C. for 7.5 hours. The greenish solution was cooled to 70° C. before adding 200 ml acetone to dilute and induce crystallization. After cooling to 13° C., the product was collected by filtration, washed with acetone, and slurried twice in acetone. After filtering and drying, the yield was 193.10 g of quaternary salt, mp 222° C.

Compound H

Compound G (171 g, 0.05 mol), Compound C (86 g, 0.25 mol), and 2000 ml dimethylformamide were mixed together. Acetic anhydride (100 ml) was added. To the stirred mixture was added 75.5 g (0.75 mol) triethylamine. The mixture was carefully heated and held between 83°–90° C. for no more than 6 minutes. The reaction cooled quickly with a methanol-ice bath to −3° C. The mixture was filtered to removed unreacted starting material and the filtrate was then poured into 5000 ml of ethyl acetate. The mixture was chilled and stirred for at least three hours, then filtered, and the isolated product reslurried in ethyl acetate. After filtration and drying, the yield was 173.10 g, mp 241° C., $\lambda_{max}$(methanol)=845 nm ($\epsilon$=250,000). A second crop of dye was recovered after letting the initial ethyl acetate quench sit overnight: 4.75 g, mp 249° C., $\lambda_{max}$(methanol)=845 nm ($\epsilon$=289,000). Compound I Compound E (1.72 g, 0.01 mol), 6-Sulfo-1-(4-sulfobutyl)-2,3,3-trimethyl-1H-benzindolium, inner salt (NKX-1632 from Nippon Kankoh Shikiso, 8.27 g, 0.02 mol), and 30 ml acetic acid were mixed together. Acetic anhydride (7 ml) was added, followed by 4.1 g (0.05 mol) anhydrous sodium acetate. The mixture was heated to reflux for 21 min., then cooled to room temperature and filtered. The filtrate was poured into 300 ml ethyl acetate and allowed to sit overnight. The solvent was decanted and replaced by fresh ethyl acetate. The mixture was agitated to break up the solid, filtered and dried. The yield was 9.20 g, mp >350° C., $\lambda_{max}$(methanol)=821 nm ($\epsilon$=226,000).

Compound J

Compound E (2.16 g, 0.0125 mol), 5-Sulfo-1-(4-Sulfobutyl)-2,3,3-trimethylindolenium, inner salt (NKX-1653 from Nippon Kankoh Shikiso, 9.38 g, 0.025 mol), and 30 ml acetic acid were mixed together. Acetic anhydride (7 ml) was added, followed by 4.1 g (0.05 mol) anhydrous sodium acetate. The mixture was heated to reflux for 20 min., then cooled to room temperature and filtered. The filtrate was poured into 300 ml ethyl acetate to copiously precipitate solid. After stirring three hours, the mixture was filtered arid the product reslurried in 150 ml ethyl acetate overnight. After filtering and drying, the yield was 13.55 g., mp 298° C. (dec), $\lambda_{max}$ (methanol)=789 nm ($\epsilon$=197,000).

Compound K

Compound C (4.3 g, 0.0125 mol), 5-Sulfo-1-(4-Sulfobutyl)-2,3,3-trimethylindolenium, inner salt (NKX-1653 from Nippon Kankoh Shikiso, 9.38 g, 0.025 mol), and 60 ml dimethylformamide were mixed together. Acetic anhydride (6.6 ml) was added, followed by 5.6 g (0.055 mol) triethylamine. The mixture was stirred at room temperature for 4.5 hours. The reaction mixture was filtered and the filtrate was poured into 200 ml ethyl acetate. After stirring at least one hour, the mixture was filtered and the product reslurried in ethyl acetate. After filtering and drying, the yield was 11.91 g., mp 154°–187° C. , $\lambda_{max}$ (methanol)=811 nm ($\epsilon$=251,000).

Compound L

3-Ethyl-2-methylbenzothiazolium iodide (I1003 from H. W. Sands, 2.44 g, 0.008 mol), Compound C (1.38 g, 0.04 mol), and 30 ml dimethylformamide were mixed together. Acetic anhydride (2.0 ml) was added, followed by 1.2 g (0.012 mol) triethylamine. The mixture was stirred at room temperature for 3 hrs. and then filtered. The collected gold-brown crystals were slurried overnight with ethyl acetate. After filtering and drying, the yield was 1.80 g, mp 222° C., $\lambda_{max}$(methanol)=807 ($\epsilon$=196,000).

Compound M 1,3-Diallyl-2-methyl-4,5-quinoxalino-imidazolium 4-toluenesulfonate 2,3-Bis-(3-allylamino)quinoxalinium 4-toluenesulfonate (16.48 g), prepared by reaction of allylamine with 2,3-dichloroquinoxaline, was refluxed with 40 ml acetic anhydride for two hours. After cooling to room temperature, the reaction mixture was poured into 300 ml of stirred diethyl ether. The resulting precipitate was broken up and triturated with ether until fine particles were obtained. Yield was 12.63 g, mp 158° C.

Compound N

Compound M (17.46 g, 0.04 mol), Compound C (6.88 g, 0.02 mol), and 200 ml dimethylformamide were mixed together. Acetic anhydride (10.4 ml) was added, followed by 6.0 g (0.06 mol) triethylamine. The mixture was stirred at room temperature for 4.5 hrs. and then filtered. The filtrate was poured into 2000 ml of water, stirred for an hour, and filtered. The product was reslurried in ethyl acetate, filtered and dried to yield 14.31 g, mp 165°–173° C., $\lambda_{max}$ (1% acetic acid/methanol)=846 nm ($\epsilon$=165,000).

SYNTHESIS OF DYE COMPOUNDS

Dye D-1 2,5-Dimercapto-1,3,4-thiadiazole, dipotassium salt (0.45 g, 0.002 mol) was mixed with 20 ml DMF. To this mixture was added 2.48 g (0.004 mol) of Compound A. After 1 hour, the reaction mixture was filtered and then poured into 200 ml of stirred water. After 60 minutes of stirring, the mixture was filtered and the collected dye dried to give 2.28 g dye, mp 208° C., $\lambda_{max}$(methanol)=741 nm ($\epsilon$=241,000), 813 ($\epsilon$=207,000).

Dye D-2

2-Mercaptopyrimidine (0.3 g, 0.0027 mol) was mixed with 10 ml DMF. Triethylamine (0.27 g, 0.0027 mol) was added. To this mixture was added 1.0 g (0.00134 mol) of Compound F. The reaction was instantaneous. The reaction mixture was filtered and then poured into 200 ml of stirred ethyl acetate. After 60 minutes of stirring, the mixture was filtered. The product was collected, washed again with ethyl acetate, filtered and dried to give 1.08 g. dye, mp 120°–195° C. (dec), $\lambda_{max}$(methanol)=798 nm ($\epsilon$=170,000).

Dye D-3

2-Benzoxazolethiol (0.6 g, 0.004 mol) was mixed with 10 ml DMF. Triethylamine (0.4 g, 0.004 mol) was added. To this mixture was added 1.5 g (0.002 mol) of Compound F. The reaction mixture was stirred 6.5 hrs at room temperature, then filtered and poured into 200 ml of stirred ethyl acetate. After 60 minutes of stirring, the mixture was filtered. The product was collected, washed again with ethyl acetate, filtered and dried to give 1.43 g dye, mp 195°–203° C. (dec), $\lambda_{max}$(methanol)=802 nm ($\epsilon$=207,000).

Dye D-4

4-Acetamidothiophenol (0.67 g, 0.004 mol) was mixed with 10 ml DMF. Sodium hydroxide (0.32 g, 0.008 mol) in 1 ml water was added. To this mixture was added 1.91 g (0.002 mol) of Compound J. The reaction was stirred for forty minutes at room temperature. The reaction mixture was filtered and then poured into 200 ml of stirred ethyl acetate. After stirring one hour, the mixture was filtered and reslurried with ethyl acetate. After filtering and drying, the yield was 2.54 g, mp 245°–258° C., $\lambda_{max}$(methanol)=801 nm ($\epsilon$=128,000). A purer sample was obtained by slurrying 1 g of the product in ethyl acetate, adding 1 ml concentrated hydrochloric acid to coagulate, decanting the solvent and redissolving the residue in methanol. The methanol solution was poured into 100 ml stirred ethyl acetate. After stirring 3 hours, the precipitate was collected by filtration, washed with ethyl acetate, and dried to yield 0.87 g, mp 272° C. (dec), $\lambda_{max}$(methanol)=802 nm ($\epsilon$=149,000).

Dye D-5

2-Mercaptopyrimidine (0.45 g, 0.004 mol) was mixed with 10 ml DMF. Sodium hydroxide (0.16 g, 0.004 mol) in 0.5 g water was added. To this mixture was added 1.91 g (0.002 mol) of Compound J. The reaction was stirred 2 hrs at room temperature. The reaction mixture was filtered and then poured into 200 ml of stirred ethyl acetate. After stirring two hours, the mixture was filtered and reslurried with ethyl acetate. After filtering and drying, the yield was 2.12 g., 310° C. (dec), $\lambda_{max}$(methanol)=803 nm ($\epsilon$=133,000).

Dye D-6

1-phenyl-1H-tetrazole-5-thiol, sodium salt (0.8 g. 0.004 mol) was mixed with 10 ml DMF. To this mixture was added 1.5 g (0.002 mol) of Compound F. The reaction mixture was stirred 4 hrs at room temperature, then filtered and then poured into 200 ml of stirred ethyl acetate. After 60 minutes of stirring, the mixture was filtered. The product was collected, washed again with ethyl acetate, filtered and dried to give 1.64 g dye, mp 180° C. (dec). $\lambda_{max}$(methanol)=806 nm ($\epsilon$=169,000).

Dye D-7

4-Methyl-4H,1,2,4-triazole-3-thiol (0.46 g, 0.004 mol) was mixed with 20 ml DMF. Sodium hydroxide (0.16 g, 0.004 mol) in 1 ml water was added. To this mixture was added 1.91 g (0.002 mol) of Compound J. The reaction was stirred one hour at room temperature. The reaction mixture was filtered and then poured into 200 ml of stirred ethyl acetate. After stirring one hour, the mixture was filtered and reslurried with ethyl acetate. After filtering and drying, the yield was 1.75 g, 310° C. (dec). $\lambda_{max}$(methanol)=809 nm ($\epsilon$=84,000).

Dye D-8

2-Benzoxazolethiol (0.61 g, 0.004 mol) was mixed with 10 ml DMF. Sodium hydroxide (0.16 g, 0.004 mol) in 0.5 ml water was added. To this mixture was added 1.91 g. (0.002 mol) of Compound J. The reaction was stirred 3.5 hrs at room temperature. The reaction mixture was filtered and then poured into 200 ml of stirred ethyl acetate. After stirring two hours, the mixture was filtered and reslurried with ethyl acetate. After filtering and drying, the yield was 1.71 g, 325° C. (dec). $\lambda_{max}$(methanol)=809 nm ($\epsilon$=148,000).

Dye D-9

3-Amino-5-mercapto-1,2,4-triazole(0.93 g, 0.008 mol) was mixed with 20 ml DMF. To this mixture was added 2.48 g (0.004 mol) of Compound A. After 3.5 hours, the reaction mixture was filtered and then poured into 200 ml of stirred water. After 60 minutes of stirring, the mixture was filtered. The dye was collected and dried to give 2.36 g dye, mp 216° C., $\lambda_{max}$(methanol)=811 nm ($\epsilon$=132,000).

Dye D-10

4-Acetamidothiophenol (2.68 g, 0.016 mol) was mixed with 40 ml DMF. A solution of 0.64 g (0.016 mol) sodium hydroxide in 2 ml water was added. To this mixture was added 4.96 g (0.008 mol) of Compound A. After 1 hour, the reaction mixture was filtered and then poured into 200 ml of stirred water. After 60 minutes of stirring, the mixture was filtered. The product was collected and dried to give 6.69 g crude dye, mp 70°–105° C., $\lambda_{max}$(methanol)=811 nm ($\epsilon$=172,000).

Dye D-11

1-Phenyl-1H-tetrazole-5-thiol, sodium salt (0.80 g, 0.004 mol) was mixed with 10 ml DMF. To this mixture was added 1.91 g (0.002 mol) of Compound J. The reaction was stirred 27 hrs at room temperature. The reaction mixture was filtered and then poured into 200 ml of stirred ethyl acetate. After stirring three hours, the mixture was filtered and reslurried with ethyl acetate. After filtering and drying, the yield was 0.80 g, 300° C. (dec). $\lambda_{max}$(methanol)=813 nm ($\epsilon$=196,000).

Dye D-12

2,5-Dimercapto-1,3,4-thiadiazole, dipotassium salt (1.8 g, 0.008 mo) was mixed with 20 ml DMF. To this mixture was added 2.48 g (0.004 mol) of Compound A. After 1 hour, the reaction mixture was filtered and then poured into 200 ml of stirred water. After 60 minutes of stirring, the mixture was filtered and the collected dye dried to give 1.44 g dye, mp 215° C., $\lambda_{max}$(methanol)=819 nm ($\epsilon$=257,000).

Dye D-13

2-Mercaptopyrimidine (0.9 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. The absorption of the solution instantaneously shifted from 797 nm to 819 nm. The reaction mixture was filtered and then poured into 200 ml of stirred water. After 60 minutes of stirring, the mixture was filtered and the collected dye dried to give 2.49 g dye, mp 245° C., $\lambda_{max}$(methanol)=819 nm ($\epsilon$=229,000).

Dye D-14

2-Mercaptobenzimidazole (1.2 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. The absorption of the solution instantaneously shifted from 797 nm to 814 nm. The reaction mixture was filtered and then poured into 200 ml of stirred water. After 60 minutes of stirring, the mixture was filtered and the collected dye reslurried with isopropanol. After filtering and drying, the yield was 1.48 g dye, mp 211°–215° C., $\lambda_{max}$(methanol)=819 nm ($\epsilon$=38,000).

Dye D-15

4-Methyl-4H-1,2,4-triazole-3-thiol (0.92 g, 0.008 mol) was mixed with 20 ml DMF. Triethylamine (0.81 g, 0.008 mol) was added. To this mixture was added 2.48 g (0.004 mol) of Compound A. After 50 minutes, the reaction mixture was filtered and then poured into 200 ml of stirred water. After 60 minutes of stirring, the mixture was filtered. The product was collected and dried to give 2.52 g dye, mp 149°–165° C., $\lambda_{max}$(methanol)=822 nm ($\epsilon$=226,000).

Dye D-16

2-Mercaptopyrimidine (0.34 g, 0.003 mol) was mixed with 10 ml DMF. To this mixture was added 0.30 g (0.003 mol) triethylamine. After mixing well, Compound D (0.91 g, 0.001 mol) was added. The reaction was instantaneous. The reaction mixture was filtered and then poured into 200 ml of stirred ethyl acetate. After 120 minutes of stirring, the mixture was filtered. The product was collected, washed again with ethyl acetate, filtered and dried to give 0.76 g dye, mp 134°–145° C., $\lambda_{max}$(methanol)=823 nm ($\epsilon$=220,000).

Dye D-17

4-Acetamidothiophenol (0.67 g, 0.004 mol) was mixed with 10 ml DMF. Triethylamine (0.404 g, 0.004 mol) was added. To this mixture was added 2.35 g (0.002 mol) of Compound K. The reaction was stirred for forty minutes at room temperature. The solvent was decanted and the residue dissolved in methanol. The solution was treated with 10 ml of 20% potassium acetate in methanol. The product immediately precipitated. After filtering and drying, the yield was 1.30 g, mp 310° C., $\lambda_{max}$ (methanol)=823 nm ($\epsilon$=164,000).

Dye D-18

2-Benzoxazolethiol (30.2 g, 0.02 mol) was mixed with 500 ml dimethylformamide (DMF). A solution of 8.0 g (0.2 mol) sodium hydroxide in 16 ml water was added. To this mixture was added 62 g (0.1 mol) of Compound A. The absorption of the solution instantaneously shifted .from 797 nm to 823 nm. The reaction mixture was filtered and then poured into 1000 ml of stirred water. After 60 minutes of stirring, the mixture was filtered and the product vacuum-dried. The dry dye was stirred 60 minutes with 200 ml methanol, filtered, and air-dried to give 49.31 g. dye, mp 139°–141° C., $\lambda_{max}$(methanol)=825 nm ($\epsilon$=211,000).

Dye D-19

2-Mercaptobenzothiazole (1.34 g, 0.008 mol) was mixed with 20 ml DMF. A solution of 0.32 g (0.008 mol) sodium hydroxide in 0.32 ml water was added. To this mixture was added 2.48 g (0.004 mol) of Compound A. After 1 hour, the reaction mixture was filtered and then poured into 200 ml of stirred water. After 60 minutes of stirring, the mixture was filtered. The dye was collected and dried to give 3.12 g, mp 70°–85° C., $\lambda_{max}$(methanol)=825 nm ($\epsilon$=183,000).

Dye D-20

5-Mercapto-1-methyltetrazole sodium salt hydrate (1.11 g, 0.008 mol) was mixed with 20 ml DMF. To this mixture was added 2.48 g (0.004 mol) of Compound A. After 2.5 hours, the reaction mixture was filtered and then poured into 200 ml of stirred water. After 60 minutes of stirring, the mixture was filtered. The product was collected and dried to give 2.67 g dye. The crude dye was rewashed with 5% aqueous sodium carbonate, filtered, and dried to give 2.44 g, mp 125°–144° C., $\lambda_{max}$(methanol)=828 nm ($\epsilon$=196,000).

Dye D-21

Compound A (1.24 g, 0.002 mol) was mixed with 1-phenyl-1H-tetrazole-5-thiol, sodium salt (0.752 g, 0.004 mol) in 10 ml dimethylformamide (DMF). The absorption of the solution instantaneously shifted from 797 nm to 830 nm. The reaction mixture was filtered, then poured into 200 ml ether. The solvent was decanted and the residual oil rinsed with both ether and water. The oil was treated with a small amount of methanol to solidify, then filtered and washed with isopropanol to collect 1.10 g golden crystals, mp 133°–140° C., $\lambda_{max}$(methanol)=829 nm ($\epsilon$=197,000).

Dye D-22

Compound A (2.48 g, 0.004 mol) was mixed with 1-(4-hydroxyphenyl-1H-tetrazole-5-thiol (ORWO OB-1209, 1.55 g, 0.008 mol) in 20 ml dimethylformamide (DMF) and 0.32 g sodium hydroxide in 1 ml water. The absorption of the solution instantaneously shifted from 797 nm to 829 nm. The reaction mixture was stirred for 20 min., filtered, and then poured into 200 ml 5% aqueous potassium carbonate. The mixture was stirred for two hours and filtered. The collected product was taken up in acetone, stirred, and filtered to yield 0.77 g, mp 197° C., $\lambda_{max}$=829 nm ($\epsilon$=211,000). The acetone rinsings were poured into 500 ml of 1% aqueous potassium carbonate, stirred 3 hours, filtered, and the product dried to give 1.58 g additional dye, mp 173°–177° C., $\lambda_{max}$=828 nm ($\epsilon$=203,000).

Dye D-23

1-Phenyl-1H-tetrazole-5-thiol, sodium salt (1.6 g, 0.008 mol) was mixed with 10 ml DMF. To this mixture was added 1.47 g (0.002 mol) of Compound D. The reaction was instantaneous. The reaction mixture was filtered and then poured into 200 ml of stirred ethyl acetate. After 60 minutes of stirring, the mixture was filtered. The product was collected, washed again with ethyl acetate, filtered and dried to give 0.50 g dye, mp 185° C. (dec), $\lambda_{max}$(methanol)=838 nm ($\epsilon$=164,000).

Dye D-24

2-Mercaptopyrimidine (0.45 g, 0.004 mol) was mixed with 10 ml DMF. Sodium hydroxide (0.16 g, 0.004 mol) in 0.5 g water was added. To this mixture was added 2.1 g (0.002 mol) of Compound I. The reaction was stirred 5.5 hrs at room temperature. The reaction mixture was filtered and then poured into 200 ml of stirred ethyl acetate. After stirring overnight, the mixture was filtered and reslurried twice with ethyl acetate. After filtering and drying, the yield was 2.18 g., mp>350° C. (dec), $\lambda_{max}$(methanol)=834 nm ($\epsilon$=199,000).

Dye 25

2,5-Dimercapto-1,3,4-thiadiazole, dipotassium salt (0.23 g, 0.001 mol) was mixed with 20 ml DMF. To this mixture was added 2.10 g (0.002 mol) of Compound I. The reaction was stirred 5.5 hrs at room temperature, then 0.33 g sodium hydroxide in 1 ml water was added. The mixture was stirred 16 hrs. at room temperature, then filtered. The filtrate was poured into 200 ml of stirred ethyl acetate. After stirring two hours, the mixture was filtered and reslurried with ethyl acetate. After filtering and drying, the yield was 2.15 g., 301° C. (dec), $\lambda_{max}$(methanol)=836 nm ($\epsilon$=234,000), 765 nm ($\epsilon$=134,000).

Dye D-26

1-phenyl-1H-tetrazole-5-thiol, sodium salt (0.8 g, 0.004 mol) was mixed with 10 ml DMF. To this mixture was added 0.91 g (0.001 mol) of Compound H. The reaction was instantaneous. The reaction mixture was filtered and then poured into 100 ml of stirred ethyl acetate. After 60 minutes of stirring, the mixture was filtered. The product was collected, washed again with ethyl acetate, filtered and dried to give 0.55 g dye, mp 285° C., $\lambda_{max}$(methanol)=879 nm ($\epsilon$=252,000).

Dye D-27

1-Phenyl-1H-tetrazole-5-thiol, sodium salt (0.4 g, 0.002 mol) was mixed with 10 ml DMF. To this mixture was added 0.6 g(0.00099 mol) Compound L. After stirring six hours at room temperature, the reaction mixture was filtered. The collected product was slurried with ethyl acetate, filtered and dried to give 0.48 g dye, mp 233°–234° C., $\lambda_{max}$(methanol) =844 nm ($\epsilon$=209,000).

Dye D-28

1-Phenyl-1H-tetrazole-5-thiol, sodium salt (0.42 g, 0.002 mol) was mixed with 10 ml DMF. To this mixture was added 0.78 g (0.001 mol) Compound N. After stirring 1.6 hours at room temperature, the reaction mixture was filtered. The filtrated was poured into 200 ml 5% aqueous potassium carbonate, stirred for three hours, then filtered and dried to give 0.69 g dye, mp 138°–143° C. (dec), $\lambda_{max}$(1% acetic acid/methanol)=874 nm ($\epsilon$=121,000).

TABLE 1

EXEMPLARY DYES

| DYE | X | R | Y | Z | n | $\lambda_{max}$ nm ($\epsilon \times 10^{-5}$) |
|---|---|---|---|---|---|---|

INDOLENINE

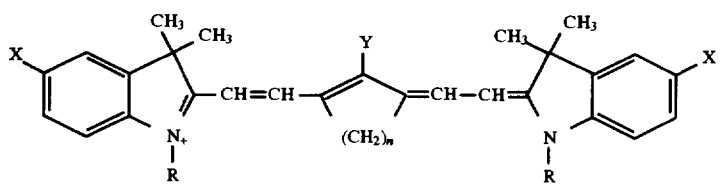

Z

| DYE | X | R | Y | Z | n | $\lambda_{max}$ nm ($\epsilon \times 10^{-5}$) |
|---|---|---|---|---|---|---|
| D-1 | H | $CH_3$ | BMTD (2:1)* | $CF_3SO_3^-$ | 2 | 741(2.41) 813(2.07) |
| D-2 | H | $(CH_2)_4SO_3^-$ | PYR | $(Et_3NH^+)$ | 3 | 798(1.69) |
| D-3 | H | $(CH_2)_4SO_3^-$ | MBO | $(Et_3NH^+)$ | 3 | 802(2.07) |
| D-4 | $SO_3^-$ | $(CH_2)_4SO_3^-$ | SAR | $3Na^+$ | 3 | 802(1.49) |

TABLE 1-continued

EXEMPLARY DYES

| DYE | X | R | Y | Z | n | $\lambda_{max}$ nm ($\epsilon \times 10^{-5}$) |
|---|---|---|---|---|---|---|
| D-5 | $SO_3^-$ | $(CH_2)_4SO_3^-$ | PYR | $3Na^+$ | 3 | 803(1.33) |
| D-6 | H | $(CH_2)_4SO_3^-$ | PMT | $Na^+$ | 3 | 806(1.69) |
| D-7 | $SO_3^-$ | $(CH_2)_4SO_3^-$ | MTT | $3Na^+$ | 3 | 809(0.83) |
| D-8 | $SO_3^-$ | $(CH_2)_4SO_3^-$ | MBO | $3Na^+$ | 3 | 809(1.48) |
| D-9 | H | $CH_3$ | AMT | $CF_3SO_3^-$ | 2 | 811(1.31) |
| D-10 | H | $CH_3$ | SAR | $CF_3SO_3^-$ | 2 | 811(1.71) |
| D-11 | $SO_3^-$ | $(CH_2)_4SO_3^-$ | PMT | $3Na^+$ | 3 | 813(1.96) |
| D-12 | H | $CH_3$ | BMTD (1:1)** | $CF_3SO_3^-$ | 2 | 819(2.57) |
| D-13 | H | $CH_3$ | PYR | $CF_3SO_3^-$ | 2 | 819(2.29) |
| D-14 | H | $CH_3$ | MBI | $CF_3SO_3^-$ | 2 | 819(0.38) |
| D-15 | H | $CH_3$ | MTT | $CF_3SO_3^-$ | 2 | 823(2.18) |
| D-16 | H | $(CH_2)_4SO_3^-$ | PYR | $(Et_3NH^+)$ | 2 | 823(2.19) |
| D-17 | $SO_3^-$ | $(CH_2)_4SO_3^-$ | SAR | $3K^+$ | 2 | 823(1.64) |
| D-18 | H | $CH_3$ | MBO | $CF_3SO_3^-$ | 2 | 825(2.11) |
| D-19 | H | $CH_3$ | MBT | $CF_3SO_3^-$ | 2 | 825(1.83) |
| D-20 | H | $CH_3$ | MMTE | $CF_3SO_3^-$ | 2 | 828(1.96) |
| D-21 | H | $CH_3$ | PMT | $CF_3SO_3^-$ | 2 | 829(1.97) |
| D-22 | H | $CH_3$ | HPMT | $CFSO_3^-$ | 2 | 829(2.11) |
| D-23 | H | $(CH_2)_4SO_3^-$ | PMT | $Na^+$ | 2 | 838(1.64) |

BENZINDOLES

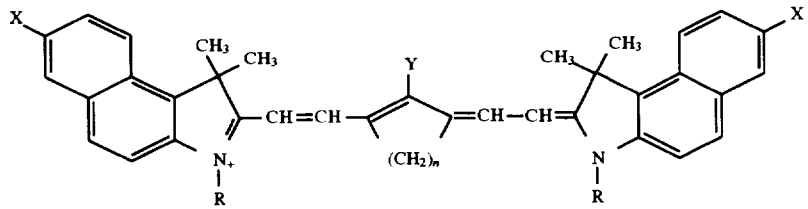

| | | | | | | |
|---|---|---|---|---|---|---|
| D-24 | $SO_3^-$ | $(CH_2)_4SO_3^-$ | PYR | $3Na^+$ | 3 | 834(2.00) |
| D-25 | $SO_3^-$ | $(CH_2)_4SO_3^-$ | BMTD (2:1)* | $3Na^+$ | 3 | 836(2.34) 736(1.33) |
| D-26 | H | $(CH_2)_4SO_3^-$ | PMT | $Na^+$ | 2 | 879(2.52) |

BENZOTHIAZOLE

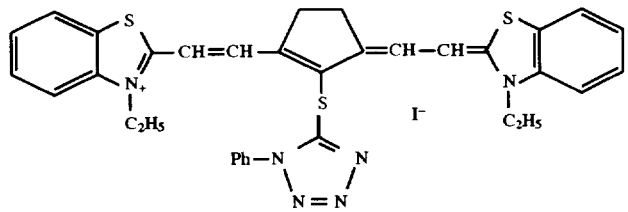

D-27 $\lambda_{max}$ = 844 nm ($\epsilon$ = 209,000)

QUINOXALINE

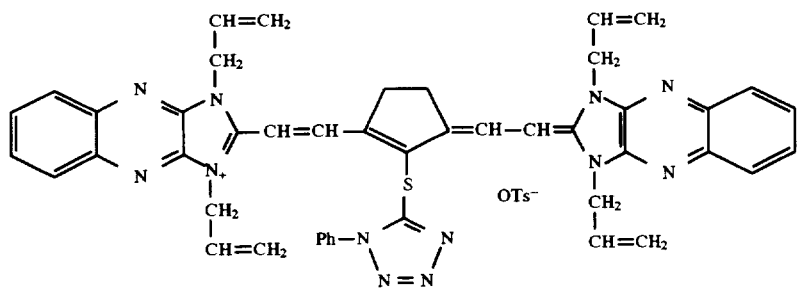

D-28 $\lambda_{max}$ = 874 nm ($\epsilon$ = 121,000)

*Two thioether links
**One thioether link

What is claimed is:
1. A dye of formula:

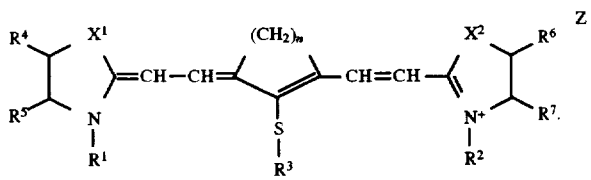

wherein $X^1$ is —S—, and $X^2$ represents —$CR^8R^9$—, —S—, —CH=CH— or —O—;

n is an integer of 2 or 3;

$R^1$ and $R^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —$OL^1$, where $L^1$ is an alkyl of 1–10 carbons;

$R^3$ represents a heterocyclic ring containing atoms chosen from a group consisting of C, N, O, S and Se;

$R^4$ and $R^5$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^3$, where $L^3$ is an alkyl of 1–10 carbons, or $R^4$ and $R^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —$OL^4$, where $L^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^5$, where $L^5$ is an alkyl of 1–10 carbons;

$R^6$ and $R^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^6$, where $L^6$ is an alkyl of 1–10 carbons, or $R^6$ and $R^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —$OL^7$, where $L^7$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^8$, where $L^8$ is an alkyl of 1–10 carbons;

$R^8$ and $R^9$ independently represent alkyl of 1–10 carbons, alkyl of 1–10 carbons substituted with at least one substituent chosen from a group consisting of sulfonate, carboxyl, hydroxy, halogen, carbonylalkyl, amine, aryl or —$OL^9$, where $L^9$ is an alkyl of 1–10 carbons, aryl of 6–10 carbons or aryl of 6–10 carbons substituted with at least one substituent chosen from a group consisting of sulfonate, carboxyl, hydroxy, halogen, carbonylalkyl, amine, aryl or —$OL^{10}$, where $L^{10}$ is an alkyl of 1–10 carbons; and Z is an anion or cation suitable to balance the charge.

2. The dye recited in claim 1, wherein at least one of $R^1$ and $R^2$ is an alkyl of 1 to 10 carbon atoms substituted with sulfonate or carbonate.

3. The dye recited in claim 1, wherein R4 and R5 or R6 and R7 are taken together to form a six-membered aromatic ring or a 10-membered aromatic ring.

4. The dye recited in claim 3, wherein said six-membered aromatic ring or said 10-membered aromatic ring is substituted with sulfonate or carboxylate.

5. The dye recited in claim 1, wherein $R^1$ or $R^2$ is an alkyl of 1–10 carbon atoms substituted with a sulfonate or carboxylate and at least one combination of $R^4$ and $R^5$ or $R^6$ and $R^7$ are taken together to form a six-membered aromatic ring or a 10-membered aromatic ring wherein said six-membered aromatic ring or said 10-membered aromatic ring is substituted with a sulfonate or a carboxylate.

6. The dye recited in claim 5, wherein $R^1$ or $R^2$ is an alkyl of 1–5 carbons atoms.

7. A dye of formula:

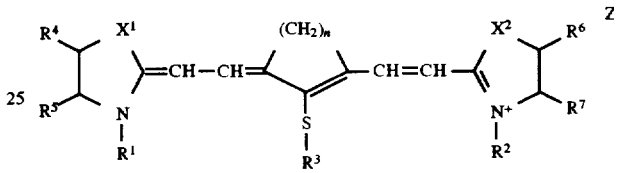

wherein $X^1$ is —S—, and $X^2$ represents —$CR^8R^9$—, —S—, —CH=CH— or —O—;

n is an integer of 2 or 3;

$R^1$ and $R^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —$OL^1$, where $L^1$ is an alkyl of 1–10 carbons;

$R^3$ is chosen from a group consisting of benzothiazole, pyrimidine, benzoxazole, phenyltetrazole, and methyl triazole;

$R^4$ and $R^5$ indenendently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^3$, where $L^3$ is an alkyl of 1–10 carbons, or $R^4$ and $R^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —$OL^4$, where $L^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^5$, where $L^5$ is an alkyl of 1–10 carbons;

$R^6$ and $R^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^6$, where $L^6$ is an alkyl of 1–10 carbons, or $R^6$ and $R^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL⁷, where L⁷ is an alkyl of 1–10 carbons or an aromatic 10-member ring substituted with at least one substituent chosen from a group consisting of sulfonate, carboxyl, hydroxy, halogen, carbonylalkyl, amine, aryl or —OL⁸, where L⁸ is an alkyl of 1–10 carbons;

R⁸ and R⁹ independently represent alkyl of 1–10 carbons, alkyl of 1–10 carbons substituted with at least one substituent chosen from a group consisting of sulfonate, carboxyl, hydroxy, halogen, carbonylalkyl, amine, aryl or —OL⁹, where L⁹ is an alkyl of 1–10 carbons, aryl of 6–10 carbons or aryl of 6–10 carbons substituted with at least one substituent chosen from a group consisting of sulfonate, carboxyl, hydroxy, halogen, carbonylalkyl, amine, aryl or —OL¹⁰, where L¹⁰ is an alkyl of 1–10 carbons; and Z is an anion or cation suitable to balance the charge.

8. The dye recited in claim 7, wherein R³ is chosen from a group consisting of pyrimidine, benzoxazole, phenyltetrazole, and methyl triazole.

9. A dye of formula:

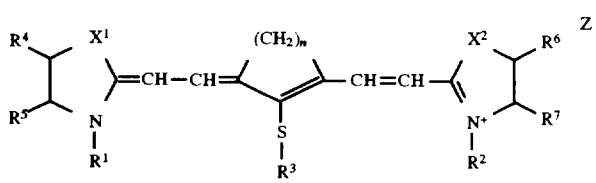

wherein

X¹ is —S— and X² represents —S—, —CH=CH— or —O—;

n is 2;

R¹ and R² independently represent alkyl of 1 to 10 carbons or alkyl of 1 to 10 carbons substituted with at least one substituent chosen from a group consisting of sulfonate, carboxyl, hydroxy, halogen, carbonylalkyl, amine, aryl or —OL¹, where L¹ is an alkyl of 1–10 carbons;

R³ a heterocyclic ring containing 5 or 6 atoms chosen from a group consisting of C, N, O, S and Se;

R⁴ and R⁵ independently represent hydrogen, alkyl of 1–10 carbons or alkyl of 1–10 carbons substituted with at least one substituent chosen from a group consisting of sulfonate, carboxyl, hydroxy, halogen, carbonylalkyl, amine, aryl or —OL³, where L³ is an alkyl of 1–10 carbons or R⁴ and R⁵ taken together may represent the atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL⁴, where L⁴ is an alkyl of 1–10 carbons or an aromatic 10-member ring substituted with at least one substituent chosen from a group consisting of sulfonate, carboxyl, hydroxy, halogen, carbonylalkyl, amine, aryl or —OL⁵, where L⁵ is an alkyl of 1–10 carbons;

R⁶ and R⁷ independently represent hydrogen, alkyl of 1–10 carbons or alkyl of 1–10 carbons substituted with at least one substituent chosen from a group consisting of sulfonate, carboxyl, hydroxy, halogen, carbonylalkyl, amine, aryl or —OL⁶, where L⁶ is an alkyl of 1–10 carbons or R⁶ and R⁷ taken together may represent the atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL⁷, where L⁷ is an alkyl of 1–10 carbons or an aromatic 10-member ring substituted with at least one substituent chosen from a group consisting of sulfonate, carboxyl, hydroxy, halogen, carbonylalkyl, amine, aryl or —OL⁸, where L⁸ is an alkyl of 1–10 carbons; and Z is an anion or cation suitable to balance the charge.

10. A dye of formula:

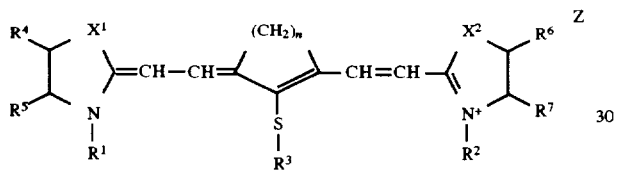

wherein

X¹ is —S— and X² represents —CR⁸R⁹—, —S, —CH=CH— or —O—;

n is 3;

R¹ and R² independently represent alkyl of 1 to 10 carbons or alkyl of 1 to 10 carbons substituted with at least one substituent chosen from a group consisting of sulfonate, carboxyl, hydroxy, halogen, carbonylalkyl, amine, aryl or —OL¹, where L¹ is an alkyl of 1–10 carbons;

R³ represents a heterocyclic ring of the type present in photographic emulsions;

R⁴ and R⁵ independently represent hydrogen, alkyl of 1–10 carbons or alkyl of 1–10 carbons substituted with at least one substituent chosen from a group consisting of sulfonate, carboxyl, hydroxy, halogen, carbonylalkyl, amine, aryl or —OL³, where L³ is an alkyl of 1–10 carbons or R⁴ and R⁵ taken together may represent the atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL⁴, where L⁴ is an alkyl of 1–10 carbons or an aromatic 10-member ring substituted with at least one substituent chosen from a group consisting of sulfonate, carboxyl, hydroxy, halogen, carbonylalkyl, amine, aryl or —OL⁵, where L⁵ is an alkyl of 1–10 carbons;

R⁶ and R⁷ independently represent hydrogen, alkyl of 1–10 carbons or alkyl of 1–10 carbons substituted with at least one substituent chosen from a group consisting of sulfonate, carboxyl, hydroxy, halogen, carbonylalkyl, amine, aryl or —OL⁶, where L⁶ is an alkyl of 1–10 carbons or R⁶ and R⁷ taken together may represent the atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —OL⁷, where L⁷ is an alkyl of 1–10 carbons or an aromatic 10-member ring substituted with at least one substituent chosen from a group consisting of sulfonate, carboxyl, hydroxy, halogen, carbonylalkyl, amine, aryl or —OL$^8$, where L$^8$ is an alkyl of 1–10 carbons;

R$^8$, R$^9$ independently represent alkyl of 1–10 carbons, alkyl of 1–10 carbons substituted with at least one substituent chosen from a group consisting of sulfonate, carboxyl, hydroxy, halogen, carbonylalkyl, amine, aryl or —OL$^9$, where L$^9$ is an alkyl of 1–10 carbons, aryl of 6–10 carbons or aryl of 6–10 carbons substituted with at least one substituent chosen from a group consisting of sulfonate, carboxyl, hydroxy, halogen, carbonylalkyl, amine, aryl or —OL$^{10}$, where L$^{10}$ is an alkyl of 1–10 carbons; and Z is an anion or cation suitable to balance the charge.

11. A dye of formula:

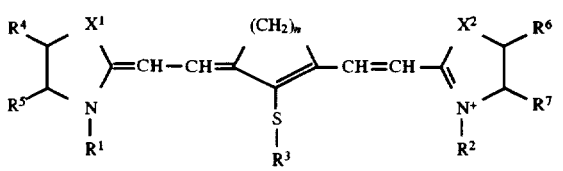

wherein X$^1$ is —S—, and X$^2$ represents —CR$^8$R$^9$—;

n is an integer of 2 or 3;

R$^1$ and R$^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —OL$^1$, where L$^1$ is an alkyl of 1–10 carbons;

R$^3$ represents a heterocyclic ring containing atoms chosen from a group consisting of C, N, O, S and Se;

R$^4$ and R$^5$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —OL$^3$, where L$^3$ is an alkyl of 1–10 carbons, or R$^4$ and R$^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —OL$^4$, where L$^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —OL$^5$, where L$^5$ is an alkyl of 1–10 carbons;

R$^6$ and R$^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —OL$^6$, where L$^6$ is an alkyl of 1–10 carbons, or R$^6$ and R$^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL$^7$, where L$^7$ is an alkyl of 1–10 carbons or an aromatic 10-member ring substituted with at least one substituent chosen from a group consisting of sulfonate, carboxyl, hydroxy, halogen, carbonylalkyl, amine, aryl or —OL$^8$, where L$^8$ is an alkyl of 1–10 carbons;

R$^8$ and R$^9$ independently represent alkyl of 1–10 carbons, alkyl of 1–10 carbons substituted with at least one substituent chosen from a group consisting of sulfonate, carboxyl, hydroxy, halogen, carbonylalkyl, amine, aryl or —OL$^9$, where L$^9$ is an alkyl of 1–10 carbons, aryl of 6–10 carbons or aryl of 6–10 carbons substituted with at least one substituent chosen from a group consisting of sulfonate, carboxyl, hydroxy, halogen, carbonylalkyl, amine, aryl or —OL$^{10}$, where L$^{10}$ is an alkyl of 1–10 carbons; and Z is an anion or cation suitable to balance the charge.

12. The dye recited in claim 11 wherein at least one of R$^1$ and R$^2$ is an alkyl of 1 to 10 carbon atoms substituted with sulfonate or carbonate.

13. The dye recited in claim 11 wherein R4 and R5 or R6 and R7 are taken together to form a six-membered aromatic ring or a 10-membered aromatic ring.

14. The dye recited in claim 11 wherein R$^1$ or R$^2$ is an alkyl of 1–10 carbon atoms substituted with a sulfonate or carboxylate and at least one combination of R$^4$ and R$^5$ or R$^6$ and R$^7$ are taken together to form a six-membered aromatic ring or a 10-membered aromatic ring wherein said six-membered aromatic ring or said 10-membered aromatic ring is substituted with a sulfonate or a carboxylate.

15. A dye of formula:

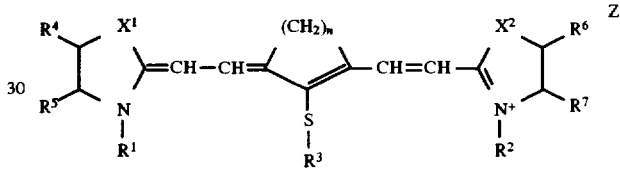

wherein X$^1$ is —S—, and X$^2$ represents —S—;

n is an integer of 2 or 3;

R$^1$ and R$^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —OL$^1$, where L$^1$ is an alkyl of 1–10 carbons;

R$^3$ a heterocyclic ring containing atoms chosen from a group consisting of C, N, O, S and Se;

R$^4$ and R$^5$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —OL$^3$, where L$^3$ is an alkyl of 1–10 carbons, or R$^4$ and R$^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —OL$^4$, where L$^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —OL$^5$, where L$^5$ is an alkyl of 1–10 carbons;

R$^6$ and R$^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —OL$^6$, where L$^6$ is an alkyl of 1–10 carbons, or R$^6$ and R$^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —$OL^7$, where $L^7$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^8$, where $L^8$ is an alkyl of 1–10 carbons; and Z is an anion or cation suitable to balance the charge.

16. The dye recited in claim 15 wherein at least one of $R^1$ and $R^2$ is an alkyl of 1 to 10 carbon atoms substituted with sulfonate or carbonate.

17. The dye recited in claim 15 wherein R4 and R5 or R6 and R7 are taken together to form a six-membered aromatic ring or a 10-membered aromatic ring.

18. The dye recited in claim 15 wherein $R^1$ or $R^2$ is an alkyl of 1–10 carbon atoms substituted with a sulfonate or carboxylate and at least one combination of $R^4$ and $R^5$ or $R^6$ and $R^7$ are taken together to form a six-membered aromatic ring or a 10-membered aromatic ring wherein said six-membered aromatic ring or said 10-membered aromatic ring is substituted with a sulfonate or a carboxylate.

19. A dye of formula:

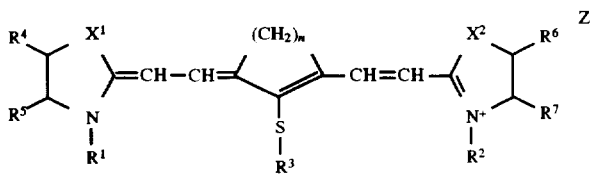

wherein $X^1$ is —S—, and $X^2$ represents —CH=CH—;

n is an integer of 2 or 3;

$R^1$ and $R^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —$OL^1$, where $L^1$ is an alkyl of 1–10 carbons;

$R^3$ represents a heterocyclic ring containing atoms chosen from a group consisting of C, N, O, S and Se;

$R^4$ and $R^5$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^3$, where $L^3$ is an alkyl of 1–10 carbons, or $R^4$ and $R^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —$OL^4$, where $L^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^5$, where $L^5$ is an alkyl of 1–10 carbons;

$R^6$ and $R^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^6$, where $L^6$ is an alkyl of 1–10 carbons, or $R^6$ and $R^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —$OL^7$, where $L^7$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^8$, where $L^8$ is an alkyl of 1–10 carbons; and Z is an anion or cation suitable to balance the charge.

20. The dye recited in claim 19 wherein at least one of $R^1$ and $R^2$ is an alkyl of 1 to 10 carbon atoms substituted with sulfonate or carbonate.

21. The dye recited in claim 19 wherein R4 and R5 or R6 and R7 are taken together to form a six-membered aromatic ring or a 10-membered aromatic ring.

22. The dye recited in claim 19 wherein $R^1$ or $R^2$ is an alkyl of 1–10 carbon atoms substituted with a sulfonate or carboxylate and at least one combination of $R^4$ and $R^5$ or $R^6$ and $R^7$ are taken together to form a six-membered aromatic ring or a 10-membered aromatic ring wherein said six-membered aromatic ring or said 10-membered aromatic ring is substituted with a sulfonate or a carboxylate.

23. A dye of formula:

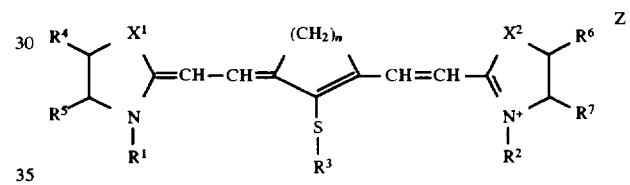

wherein $X^1$ is —S—, and $X^2$ represents —O—;

n is an integer of 2 or 3;

$R^1$ and $R^2$ independently represent alkyl of 1 to 10 carbons or an alkyl of 1 to 10 carbons substituted with at least one substituent chosen from a group consisting of sulfonate, carboxyl, hydroxy, halogen, carbonylalkyl, amine, aryl or —OL1, where $L^1$ is an alkyl of 1–10 carbons;

$R^3$ represents a heterocyclic ring containing atoms chosen from a group consisting of C, N, O, S and Se;

$R^4$ and $R^5$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —$OL^3$, where $L^3$ is an alkyl of 1–10 carbons, or $R^4$ and $R^5$ taken together represent atoms necessary to form a 5 or 6-membered aliphatic ring, an aromatic six-membered ring, an aromatic 10-membered ring, aromatic six-member ring substituted with at least one substituent chosen from a group consisting of sulfonate, carboxyl, hydroxy, halogen, carbonylalkyl, amine, aryl or —$OL^4$, where $L^4$ is an alkyl of 1–10 carbons or an aromatic 10-member ring substituted with at least one substituent chosen from a group consisting of sulfonate, carboxyl, hydroxy, halogen, carbonylalkyl, amine, aryl or —$OL^5$, where $L^5$ is an alkyl of 1–10 carbons;

$R^6$ and $R^7$ independently represent hydrogen, alkyl of 1–10 carbons or an alkyl of 1–10 carbons substituted with at least one substituent chosen from a group consisting of sulfonate, carboxyl, hydroxy, halogen, carbonylalkyl, amine, aryl or —OL$^6$, where L$^6$ is an alkyl of 1–10 carbons, or R$^6$ and R$^7$ taken together represent atoms necessary to form a 5 or 6-membered aliphatic ring, an aromatic six-membered ring, an aromatic 10-membered ring, an aromatic six-member ring substituted with at least one substituent chosen from a group consisting of sulfonate, carboxyl, hydroxy, halogen, carbonylalkyl, amine, aryl or —OL$^7$, where L$^7$ is an alkyl of 1–10 carbons or an aromatic 10-member ring substituted with at least one substituent chosen from a group consisting of sulfonate, carboxyl, hydroxy, halogen, carbonylalkyl, amine, aryl or —OL$^8$, where L$^8$ is an alkyl of 1–10 carbons; and Z is an anion or cation suitable to balance the charge.

24. The dye recited in claim 23 wherein at least one of R$^1$ and R$^2$ is an alkyl of 1 to 10 carbon atoms substituted with sulfonate or carbonate.

25. The dye recited in claim 23 wherein R4 and R5 or R6 and R7 are taken together to form a six-membered aromatic ring or a 10-membered aromatic ring.

26. The dye recited in claim 23 wherein R$^1$ or R$^2$ is an alkyl of 1–10 carbon atoms substituted with a sulfonate or carboxylate and at least one combination of R$^4$ and R$^5$ or R$^6$ and R$^7$ are taken together to form a six-membered aromatic ring or a 10-membered aromatic ring wherein said six-membered aromatic ring or said 10-membered aromatic ring is substituted with a sulfonate or a carboxylate.

* * * * *